US008727072B2

(12) United States Patent
Ayle

(10) Patent No.: US 8,727,072 B2
(45) Date of Patent: May 20, 2014

(54) METHOD FOR MAKING ACOUSTIC HONEYCOMB

(71) Applicant: Earl Ayle, Chandler, AZ (US)

(72) Inventor: Earl Ayle, Chandler, AZ (US)

(73) Assignee: Hexcel Corporation, Dublin, CA (US)

( * ) Notice: Subject to any disclaimer, the term of this patent is extended or adjusted under 35 U.S.C. 154(b) by 60 days.

(21) Appl. No.: 13/786,774

(22) Filed: Mar. 6, 2013

(65) Prior Publication Data
US 2014/0013601 A1 Jan. 16, 2014

Related U.S. Application Data

(60) Division of application No. 13/279,484, filed on Oct. 24, 2011, now Pat. No. 8,413,761, and a continuation-in-part of application No. 12/961,112, filed on Dec. 6, 2010, now Pat. No. 8,066,098, and a division of application No. 12/151,886, filed on May 9, 2008, now Pat. No. 7,854,298, and a division of application No. 11/099,337, filed on Apr. 4, 2005, now Pat. No. 7,434,659.

(51) Int. Cl.
G10K 11/172 (2006.01)

(52) U.S. Cl.
USPC ........................................ 181/292

(58) Field of Classification Search
USPC .......... 181/284, 286, 288, 290, 291, 292, 293
See application file for complete search history.

(56) References Cited

U.S. PATENT DOCUMENTS

| | | | | |
|---|---|---|---|---|
| 3,895,152 A | * | 7/1975 | Carlson et al. ................. | 428/116 |
| 3,952,831 A | * | 4/1976 | Bernard et al. ............... | 181/292 |
| 4,265,955 A | * | 5/1981 | Harp et al. ..................... | 428/116 |
| 5,490,602 A | * | 2/1996 | Wilson et al. .................. | 216/56 |
| 5,785,919 A | * | 7/1998 | Wilson ........................... | 264/401 |
| 5,997,985 A | * | 12/1999 | Clarke et al. ................... | 428/116 |
| 6,114,652 A | * | 9/2000 | Clarke et al. ............. | 219/121.71 |
| 6,274,216 B1 | * | 8/2001 | Gonidec et al. ............... | 428/116 |
| 6,371,242 B1 | * | 4/2002 | Wilson et al. .................. | 181/292 |
| 6,536,556 B2 | * | 3/2003 | Porte et al. ..................... | 181/292 |
| 6,871,725 B2 | * | 3/2005 | Johnson ........................ | 181/292 |
| 7,434,659 B2 | * | 10/2008 | Ayle .............................. | 181/292 |
| 7,510,052 B2 | * | 3/2009 | Ayle .............................. | 181/292 |
| 7,854,298 B2 | * | 12/2010 | Ayle .............................. | 181/292 |
| 2001/0017232 A1 | * | 8/2001 | Hogeboom et al. .......... | 181/286 |
| 2004/0237502 A1 | * | 12/2004 | Moe et al. ....................... | 60/204 |
| 2005/0147790 A1 | * | 7/2005 | Levavasseur ................. | 428/116 |

FOREIGN PATENT DOCUMENTS

| | | | | |
|---|---|---|---|---|
| GB | 2252076 | | 7/1992 | |
| GB | 2252076 A | * | 7/1992 | ............... B32B 3/12 |
| JP | 2000088062 | | 3/2000 | |

* cited by examiner

Primary Examiner — Jeremy Luks
(74) Attorney, Agent, or Firm — W. Mark Bielawski; David J. Oldenkamp

(57) ABSTRACT

A method for making an acoustic structure that includes a honeycomb having cells in which septum caps are located. The septum caps are formed from sheets of flexible material that may be perforated before or after the material is inserted into the honeycomb. The flexible material is sufficiently flexible to allow folding into the shape of a septum cap. The flexible material is also sufficiently stiff to provide frictional engagement and locking of the septum cap to the honeycomb cell when the cap is inserted into the honeycomb during fabrication of the acoustic structure. An adhesive is applied to the septum caps after the caps have been inserted into the honeycomb cells to provide a permanent bond.

20 Claims, 3 Drawing Sheets

METHOD FOR MAKING ACOUSTIC HONEYCOMB

This application is a divisional of copending U.S. patent application Ser. No. 13/279,484, which was filed on Oct. 24, 2011, which is a continuation-in-part of U.S. patent application Ser. No. 12/961,112, which was filed on Dec. 6, 2010 and which has issued as U.S. Pat. No. 8,066,098, which is a divisional of U.S. patent application Ser. No. 12/151,886, which was filed on May 9, 2008 and which has issued as U.S. Pat. No. 7,854,298, which is a divisional of U.S. patent application Ser. No. 11/099,337 which has issued as U.S. Pat. No. 7,434,659.

BACKGROUND OF THE INVENTION

1. Field of the Invention

The present invention relates generally to acoustic systems that are used to attenuate noise. More particularly, the present invention involves using honeycomb to make nacelles and other structures that are useful in reducing the noise generated by a jet engine or other noise source.

2. Description of Related Art

It is widely recognized that the best way of dealing with excess noise generated by a specific source is to treat the noise at the source. This is typically accomplished by adding acoustic damping structures (acoustic treatments) to the structure of the noise source. One particularly problematic noise source is the jet engine used on most passenger aircraft. Acoustic treatments are typically incorporated in the engine inlet, nacelle and exhaust structures. These acoustic treatments include acoustic resonators that contain relatively thin acoustic materials or grids that have millions of holes that create acoustic impedance to the sound energy generated by the engine. The basic problem that faces engineers is how to add these thin and flexible acoustic materials into the structural elements of the jet engine and surrounding nacelle to provide desired noise attenuation.

Honeycomb has been a popular material for use in aircraft and aerospace vehicles because it is relatively strong and lightweight. For acoustic applications, the goal has been to somehow incorporate the thin acoustic materials into the honeycomb structure so that the honeycomb cells are closed or covered. The closing of the cells with acoustic material creates the acoustic impedance upon which the resonator is based.

One approach to incorporating thin acoustic materials into honeycomb is referred to as the sandwich design. In this approach, the thin acoustic sheet is placed between two slices of honeycomb and bonded in place to form a single structure. This approach has advantages in that one can utilize sophisticated acoustic material designs that are woven, punched or etched to exact dimensions and the bonding process is relatively simple. However, a drawback of this design is that the strength of the structure is limited by the bond between the two honeycomb slices and the acoustic material. Also, the bonding surface between the two honeycomb slices is limited to the surface area along the edges of the honeycomb. In addition, there is a chance that some of the holes in the acoustic material may be closed with excess adhesive during the bonding process. It is important that the holes not be closed because this can result in loss of active acoustical area of the resonator.

A second approach uses relatively thick solid inserts that are individually bonded in place within the honeycomb cells. Once in place, the inserts are drilled or otherwise treated to form the holes that are necessary for the inserts to function as an acoustic material. This approach eliminates the need to bond two honeycomb slices together. The result is a strong structure in which the inserts are securely bonded. However, this approach also has a few drawbacks. For example, the cost and complexity of having to drill millions of holes in the solid inserts is a major drawback. In addition, the relatively thick solid inserts make the honeycomb stiff and difficult to form into non-planar structures, such as nacelles for jet engines.

SUMMARY OF THE INVENTION

In accordance with the present invention, honeycomb acoustic structures are provided in which individual sheets of acoustic material are formed into septum caps that are inserted into the honeycomb cells. The septum caps have a flange portion that is substantially thicker than the acoustic material and provide an anchoring surface that is used to attach the septum cap to the walls of the honeycomb. The septum caps are initially held in place within the cells by frictional locking between the anchoring surface and the cell walls. This frictional locking is sufficient to keep the septum caps in position until they are permanently bonded in place with an adhesive.

The acoustic structures of the present invention are designed to be located near a source of noise, such as a jet engine or other power plant. The structures include a honeycomb that has a first edge which is to be located nearest the source of noise and a second edge located away from the source. The honeycomb includes a plurality of walls that extend between the first and second edge of the honeycomb. The walls of the honeycomb define a plurality of cells wherein each of the cells has a cross-sectional area measured perpendicular to honeycomb walls and a depth defined by the distance between the first and second edges.

As a feature of the present invention, a septum cap is located within at least one of the honeycomb cells and covers the entire cross-sectional area of the cell. The septum cap is made from a sheet of acoustic material that has a thickness and a perimeter. The sheet is preferably rectangular in shape. The septum cap includes a resonator portion that has an outer edge located adjacent to the honeycomb walls and a flange portion that extends between the outer edge of the resonator portion and the perimeter of the sheet of acoustic material. The flange portion has an anchoring surface that is initially attached to the cell walls via a frictional engagement to form a precursor structure. The anchoring surface has a width wherein the width of the anchoring surface is substantially greater than the thickness of the sheet of acoustic material so that it provides the required degree of frictional locking between the septum caps and the honeycomb walls. The final acoustic structure is made by taking the precursor structure and applying an adhesive to the anchoring surface and the cell wall to permanently bond the septum in place.

The present invention provides a number of advantages over existing honeycomb acoustic structures. For example, there is no seam between two honeycomb slices to weaken the structure. The septum caps may be placed at different levels within the honeycomb cells to provide fine-tuning of noise attenuation based on well-known Helmholtz resonator theory. Multiple septum caps may be placed in a single honeycomb cell at different levels to create multiple cavities and impedance grids. Septum caps made from different acoustic materials may be used in the same honeycomb structure or even within the same honeycomb cell. The flange portion provides a relatively large anchoring surface area to insure secure bonding of the septum cap to the cell wall over the lifetime of the structure. In addition, the relatively thin and flexible septum caps do not reduce the flexibility of the honeycomb, which is an important consideration for nacelles and other non-planar acoustic structure.

The above discussed and many other featured and attendant advantages of the present invention will become better understood by reference to the following detailed description when taken in conjunction with the accompanying drawings.

DETAILED DESCRIPTION OF THE INVENTION

Figure 1:
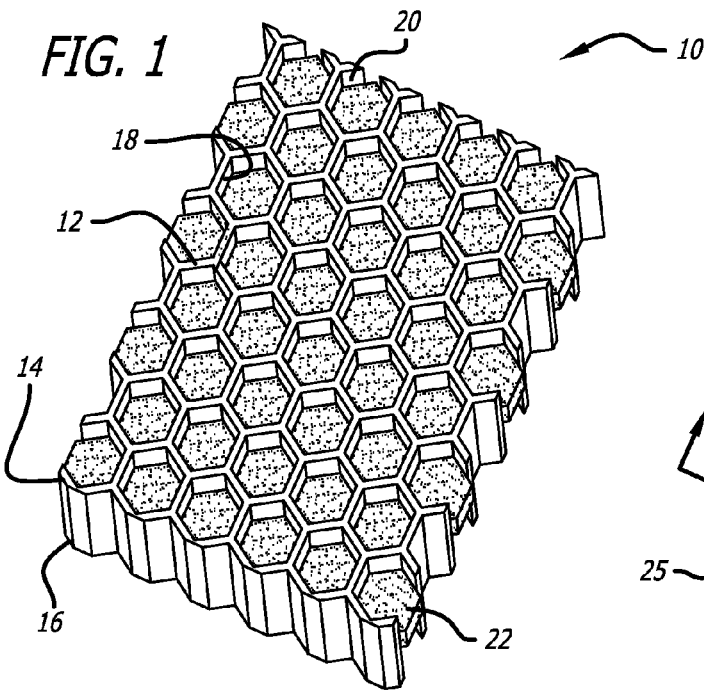
FIG. 1 is a perspective view of an exemplary acoustic structure in accordance with the present invention.
Figure 8:
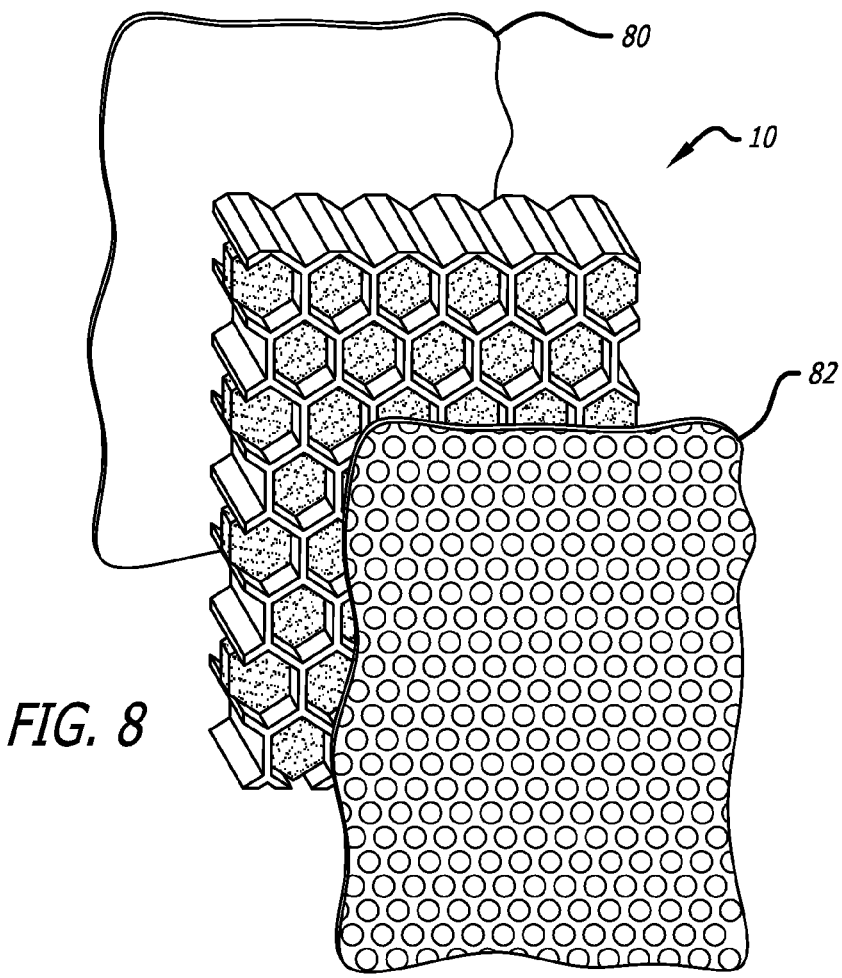
FIG. 8 is an exploded perspective view showing a portion of a solid skin, acoustic structure and perforated skin that are combined together to form an acoustic structure of the type shown in FIG. 9.

An exemplary acoustic structure in accordance with the present invention is shown generally at 10 in FIGS. 1 and 8. The acoustic structure 10 includes a honeycomb 12 having a first edge 14 which is to be located nearest the noise source and a second edge 16. The honeycomb 10 includes walls 18 that extend between the two edges 14 and 16 to define a plurality of cells 20. Each of the cells 20 has a depth (also referred to as the core thickness) that is equal to the distance between the two edges 14 and 16. Each cell 20 also has a cross-sectional area that is measured perpendicular to the cell walls 18. The honeycomb can be made from any of the conventional materials used in making honeycomb panels including metals, ceramics, and composite materials.

As a feature of the present invention, septum caps 22 are located within the cells 20. It is preferred, but not necessary, that the septum caps 22 be located in most, if not all, of the cells 20. In certain situations, it may be desirable to insert the septum caps 22 in only some of the cells to produce a desired acoustic effect. Alternatively, it may be desirable to insert two or more septum caps into a single cell.

Figure 2:
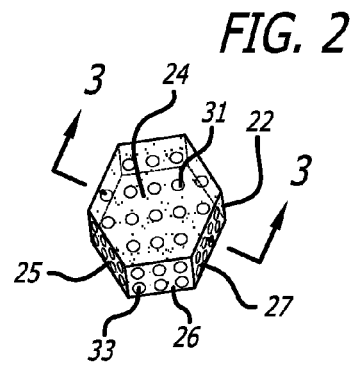
FIG. 2 is a perspective view of an exemplary septum cap in accordance with the present invention.
Figure 3:
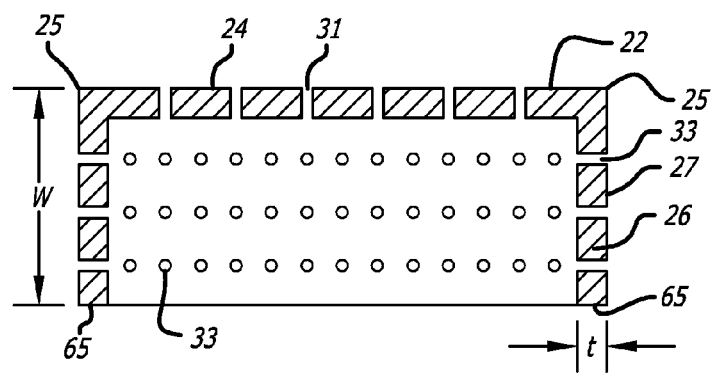
FIG. 3 is a cross sectional view of the exemplary septum cap shown in FIG. 2 taken in the 3-3 plane.
Figure 6:
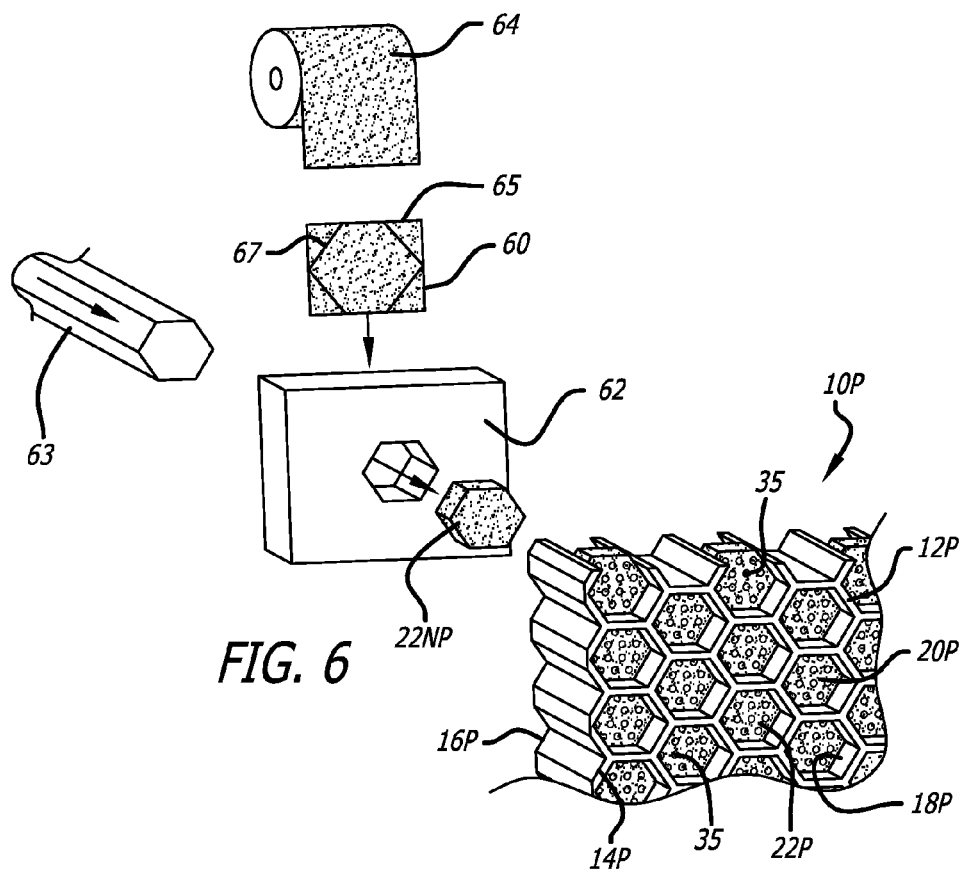
FIG. 6 is a schematic representation of a portion of the fabrication process for making acoustic structures where the septum cap is formed from a sheet of acoustic material and inserted into the honeycomb to form a precursor structure.

An exemplary septum cap 22 is shown in FIGS. 2 and 3. The septum cap 22 is formed from a sheet of acoustic material by folding the sheet into a hexagonal shaped cap that is sized to match the cross-sectional areas of the honeycomb cells. The septum cap 22 is preferably formed as shown in FIG. 6 by forcing the sheet 60 of acoustic material through a cap folding die 62 using plunger 63. The sheet 60 is preferably slightly rectangular in shape and cut from a roll of acoustic material 64. The sheet 60 has a thickness (t) as shown in FIG. 3 and a perimeter 65. The size and shape of the sheet 60 may be varied widely depending upon the shape/size of the honeycomb cell into which the sheet is inserted, the thickness of the sheet 60 and the particular acoustic material being used.

Referring to FIGS. 2 and 3, the septum cap 22 includes a resonator portion 24 that has outer edge 25. The septum cap 22 further includes a flange portion 26 that has an anchoring surface 27 which is initially attached to the cell walls 18 by friction engagement followed by permanent bonding using an appropriate adhesive. The anchoring surface 27 has a width (W).

The width (W) of the anchoring surface may be varied depending upon a number of factors including the cross-sectional area of the cells, the thickness of the acoustic material, the type of acoustic material and the adhesive. For a typical honeycomb having ¼ to 1 inch cells, anchoring surface widths on the order of 0.05 inch to 0.500 inch are suitable for acoustic material that has a thickness on the order of 0.001 inch to 0.10 inch. For standard acoustic materials having a thickness of from 0.004 to 0.006 inch, anchoring surface widths of at least 0.20 inch are preferred. In general, it is preferred that the width of the anchoring surface be substantially greater than the thickness of the acoustic material, "Substantially greater" means that the width of the anchoring surface is at least 5 times greater than the thickness of the acoustic material and preferably at least 20 times greater.

Any of the standard acoustic materials may be used to form the septum caps. These acoustic materials are typically provided as relatively thin sheets that are perforated, porous or an open mesh fabric that is designed to provide noise attenuation. Perforated and porous sheets of various materials (metals, ceramics, plastics) may be used. In one preferred embodiment the acoustic material is an open mesh fabric that is woven from monofilament fibers. The fibers may be composed of glass, carbon, ceramic or polymers. Monofilament polymer fibers made from polyamide, polyester, polyethylene chlorotrifluoroethylene (ECTFE), ethylene tetrafluoroethylene (ETFE), polytetrafluoroethylene (PTFE), polyphenylene sulfide (PPS), polyfluoroethylene propylene (FEP), polyether ether ketone (PEEK), polyamide 6 (Nylon, 6 PA6) and polyamide 12 (Nylon 12, PA12) are just a few examples. Open mesh fabric made from PEEK is preferred for high temperature applications. Open mesh acoustic fabrics and other acoustic materials that may be used to form the septum caps in accordance with the present invention are available from a wide variety of commercial sources. For example, sheets of open mesh acoustic fabric may be obtained from SEFAR America Inc. (Buffalo Division Headquarters 111 Calumet Street Depew, N.Y. 14043) under the trade names SEFAR PETEX, SEFAR NITEX and SEFAR PEEKTEX.

Another preferred embodiment involves the use of solid sheets of acoustic material where perforations are formed in the material either before or after the septum cap is formed. Although metals, ceramics and plastics of the type identified above may be used for this embodiment, it is preferred that the acoustic material be PEEK or a similar chemically resistant polymer material that is suitable for high temperature applications. Sheets or films of PEEK are available commercially from a number of sources, such as Victrex USA (Greenville, S.C.) which produces sheets of PEEK under the tradename VICTREX® PEEK™ polymer.

PEEK is a crystalline thermoplastic that can be processed to form sheets that are either in the amorphous or crystalline phase. Films typically have a thickness of from 0.001 to 0.006 inch. Compared to the crystalline PEEK films, amorphous PEEK films are more transparent and easier to thermoform. Crystalline PEEK films are formed by heating amorphous PEEK films to temperatures above the glass transition temperature ($T_g$) of the amorphous PEEK for a sufficient time to achieve a degree of crystallinity on the order of 30% to 35%. Crystalline PEEK films have better chemical resistance and wear properties than the amorphous films. The crystalline PEEK films are also less flexible and have more bounce-back than the amorphous film. Bounce-back is the force or bias that a folded film exerts towards returning to its original pre-folded (flat) shape.

Both crystalline and amorphous PEEK films may be used as septum caps provided that one takes into account the difference in flexibility and bounce-back between the two materials when designing a particular septum cap for a particular honeycomb cell. In general, a thicker film of amorphous PEEK is required to provide a septum cap that has the same degree of friction-locking that is provided by a thinner crystalline film. For example, if a film of crystalline PEEK that is 0.002 inch thick is determined to have the required stiffness and bounce-back to provide adequate friction-locking of a particular septum configuration, then one would need to use an amorphous film that is 0.003 inch thick or more in order to achieve the same degree of friction-locking.

Solid films of PEEK or other plastic may be perforated using any technique that provides multiple openings in the solid film. The perforations or holes may be drilled mechanically or using chemicals. It is preferred that the perforations be made by laser drilling holes through the relatively thin PEEK film. In one embodiment, a flat sheet of PEEK film is laser drilled to provide the desired number of perforations prior to forming the film into a septum cap. An advantage of this procedure is that the flat surface provided by the film makes it easier to keep the laser beam focused on the film during the drilling operation. In addition, the resonator portion and flange portions of the septum cap are perforated without having to refocus the laser. The septum cap 22 shown in FIG. 3 includes perforations or holes 31 and 33 in the resonator portion 24 and flange portion 26, respectively. An additional advantage of pre-drilling the entire film prior to folding it to form the septum is that the holes 33 in the flange portion 24 provide added surface area and openings where adhesive can enter to improve the bonding of the flange to the cell wall.

In another embodiment, the resonator portion of the septum cap is not laser drilled until after the septum cap has been inserted into the honeycomb. As shown in FIG. 6, a solid sheet of PEEK 60 is formed into a septum cap 22NP (Not Perforated) and inserted into honeycomb 12P. The resonator portion of the septum cap is then perforated by laser drilling to provide holes 35. The laser drilling of the resonator portion may be conducted before or after the septums are permanently bonded into the honeycomb. It is preferred that the laser drilling be delayed until after the septums have been permanently bonded in place. An advantage of this procedure is that in some situations, especially where numerous perforations in the film are necessary, one can use a thinner film than is possible when the septum film is pre-drilled. The inclusion of numerous holes in the film tends to reduce the stiffness and level of bounce-back of the film so that the resultant friction-locking of the septum within the cell is also reduced. Accordingly, by delaying drilling of holes until after the septum has been inserted, friction-locked and permanently bonded within the cell, one can obtain the maximum bounce-back and friction-locking that is possible with a given film. In addition, laser drilling the holes after the septums are in place avoids the possibility of perforations being inadvertently blocked by misplaced adhesive. A disadvantage of this embodiment is that the resonator portion of the folded septum may not be entirely flat so that the laser may need to be refocused during the drilling operation.

Figure 4:
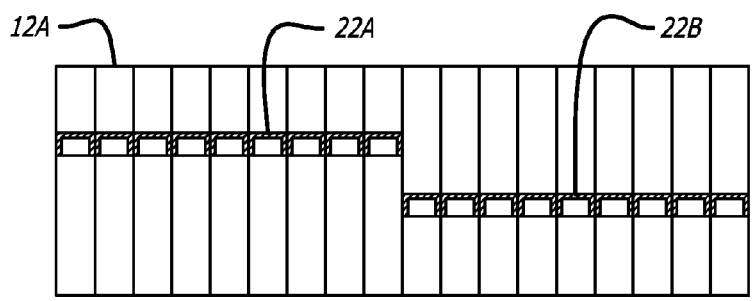
FIG. 4 is a cross sectional view of an exemplary acoustic structure in accordance with the present invention where two sets of septum caps are located at two different depths within the honeycomb cells.

The septum caps 22 may be inserted into the honeycomb cell to provide a wide variety of acoustic designs. For example, the septum caps may be located at different levels within the honeycomb 12a as shown at 22a and 22b in FIG. 4. This type of design allows fine-tuning of the noise attenuation properties of the acoustic structure. The two-level design shown in FIG. 4 is intended only as an example of the wide variety of possible multi-level septum arrangements that are possible in accordance with the present invention. As will be appreciated by those skilled in the art, the number of different possible septum placement levels is extremely large and can be tailored to meet specific noise attenuation requirements.

Figure 5:
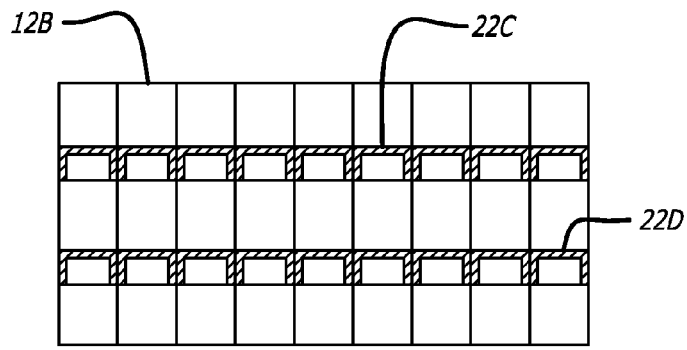
FIG. 5 is a cross sectional view of an exemplary acoustic structure in accordance with the present invention where two septum caps are located within each honeycomb cell.

Another example of an insertion configuration for the septum caps 22 is shown in FIG. 5. In this configuration, two sets of septum caps 22c and 22d are inserted into the honeycomb 12b to provide each cell with two septum caps. As is apparent, numerous possible additional configurations are possible where three or more septum caps are inserted into a given cell. In addition, the multi-level insertion design exemplified in FIG. 4 may be combined with the multiple insertion per cell design exemplified in FIG. 5 to provide an unlimited number of possible septum cap insertion configurations that can be used to fine tune the acoustic structure to provide optimum noise attenuation for a given source of noise.

As previously mentioned, the preferred method for inserting the septum caps into the honeycomb is shown in FIG. 6 where the septum cap is pre-formed using cap folding die 62 and plunger 63. The reference numerals used to identify the honeycomb structure in FIG. 6 are the same as in FIG. 1, except that they include a "p" to indicate that the structure is a precursor structure wherein the septum caps are not yet permanently bonded to the cell walls.

It should be noted that the use of a cap-folding die 62 to form the septum cap from the individual sheets of acoustic material is preferred, but not required. It is possible to use the honeycomb as the die and form the septum cap by simply forcing the sheet 60 into the cells using plunger 63. However, the edges of many honeycomb panels tend to be relatively jagged because the panels are typically cut from a larger block of honeycomb during the fabrication process. Accordingly, the honeycomb edges tend to catch, tear and contaminate the acoustic material when a flat sheet of material is forcibly inserted directly into the cell. Accordingly, if desired, the cap-folding die may be eliminated, but only if the edges of the honeycomb are treated to remove any rough or jagged edges.

It is important that the size/shape of the sheet of acoustic material and the size/shape of the die/plunger (or just the plunger if the die is not used) be chosen such that the septum cap can be inserted into the cell without damaging the acoustic material while at the same time providing enough frictional contact between the anchoring surface and the cell wall to hold the septum cap in place during subsequent handling of the precursor structure. Routine experimentation can be used to determine the various sizes and shapes of acoustic sheets that are required in order to achieve the necessary frictional locking or holding of the septum caps in place in the precursor structure prior to permanent bonding of the anchoring surface to the cell wall with adhesive. The amount of frictional locking or holding should be sufficient to keep the septum caps from falling out of the honeycomb, even if the precursor structure is inadvertently dropped during handling.

For a standard ⅜ inch composite honeycomb made from conventional materials, such as fiberglass, phenolic, Nomex and aluminum, the sheet of PEEK film material (0.001 to 0.015 inch thick) can be a rectangle 65 or a shape 67 matching the cell shape as shown in FIG. 6. For rectangular sheet, the rectangle should have dimensions ranging from 0.50 to 0.70 inch by 0.60 to 0.80 inch. For film material that is cut to match the shape of the cell, the sheet should be oversized a sufficient amount to provide a septum cap having the desired flange portion width. With respect to rectangular sheets that are folded into a septum cap, it is preferred that the sheet of acoustic material is not notched or otherwise cut in an effort to enhance folding of the sheet. It was found that the sheets, without notching, folded into septum caps that had wrinkles in the anchoring surfaces that enhanced the bonding of the septum caps to the honeycomb walls. In addition, notching tends to release some of the outward tension or bias force (bounce-back) that would otherwise be present in the flange portion of the septum cap. This outward bounce-back force or bias is a result of the polymer in the folded sheet being inherently biased back towards an unfolded position. This outward force or bounce-back is an important part of the frictional locking between the septum cap and the cell wall.

Frictional-locking of the septum cap is achieved by using a combination of flange size, film stiffness/bounce-back and packing of septum material in the corners of the honeycomb. Hexagonal septum caps that are formed from rectangular sheets of material 65 tend to have extra material that can be compressed into the corners of the cell to provide additional friction-locking when relatively thin films with low-bounce back are used. In order to reduce weight and wrinkling of the film, it is preferred that the sheets of film used to form the septum cap have a perimeter (67 in FIG. 5) that more closely resembles the final septum cap shape, so as to form a more uniform flange. In this preferred configuration, the size of the flange and bounce-back of the film provide substantially all of the friction locking of the septum cap to the cell wall. For this type of preferred septum cap configuration, materials that are more flexible and have less bounce-back generally require larger flanges than materials that are less flexible and have more bounce-back.

The degree of frictional locking of the septum to the honeycomb can be measured by placing test weights onto the septums and determining if there is any resulting movement of the septum. For example, a septum is considered to be frictionally locked to the honeycomb wall with an acceptable amount of locking force if it passes the following test. A 27 gram test weight is placed on top of the dry septum from the inserted side. The friction locking force is acceptable when the dry cap will support the 27 grams without sliding down the honeycomb cell. In an exemplary test, the 27 gram test weight is a steel rod that is 0.368 inch in diameter and 2.00 inches long.

With respect to films of PEEK (thicknesses of 0.001 to 0.015 inch), the films all are sufficiently flexible to be formed into septum caps. However, the particular film that is used for a particular size and shape of septum cap will be determined by changing the film bounce-back by varying film thickness and film type (crystalline or amorphous) as well as varying the flange width to establish the combination of film bounce-back and flange width that is necessary to friction-lock the septum to the cell walls.

The number and size of holes that are drilled in the septum cap, as well as the hole pattern, may be varied depending upon the desired final acoustic properties for the acoustic structure. The holes or perforations will typically vary in size from 0.002 to 0.015 inch and are preferably circular in shape. Holes that are not circular may be used, if desired. Other suitable hole shapes include elliptical, square or slotted. The number of holes drilled in the resonator portion will vary depending upon hole size and desired acoustic properties. For holes that are from 0.002 to 0.015 inch in diameter, it is preferred that the number of holes range from 100 to 700 per square inch for most acoustic applications. It is preferred that the number of holes and hole size be selected to provide the Rayl value and the Non Linear Factor (NLF) required for the individual acoustic application. The NLF will increase as fewer larger holes are used to meet the Rayl requirements, while a lower NLF will be produced by increasing the number of smaller holes to meet a similar Rayl requirement.

The surface area of the holes should be kept below 20 percent of the overall resonator portion surface area in order to maintain film integrity and to provide sufficient bounce-back for friction-locking to the cell walls. If desired the number and size of the holes may be varied between the resonator portion and the flange portion. This allows the use of one hole configuration in the resonator portion to maximize acoustic properties while also allowing the use of another hole configuration in the flange to maximize adhesive interaction and resultant bonding to the cell wall.

A precursor structure is shown at 10*p* in FIG. 6 where the septum caps 22 are held in place only by frictional locking. As mentioned previously, the frictional locking must be sufficient to hold the septum caps securely in position until they can be permanently bonded using an appropriate adhesive. The adhesive that is used can be any of the conventional adhesives that are used in honeycomb panel fabrication. Preferred adhesives include those that are stable at high temperature (300-400° F.). Exemplary adhesives include epoxies, acrylics, phenolics, cyanoacrylates, BMI's, polyamide-imides, and polyimides.

The adhesive may be applied to the anchoring surface/cell wall interface using a variety of known adhesive application procedures. An important consideration is that the adhesive should be applied selectively only to the flange anchoring surface/cell wall interface and not to the resonator portion of the septum cap. Application of the adhesive to the resonator portion will result in closing or at least reducing the size of the openings in the mesh or other acoustic material. Any adhesive application procedure that can provide selective application of adhesive to the anchoring surface/cell wall interface may be used.

Figure 7:
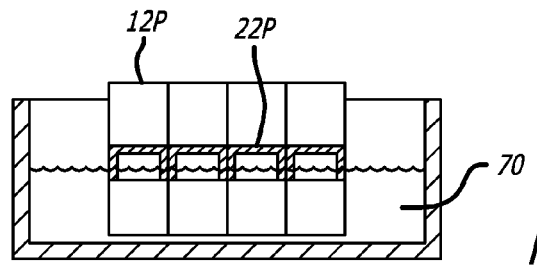
FIG. 7 is a sectional view showing an exemplary preferred method for applying adhesive to the anchoring surface of the septum cap and honeycomb wall by dipping the precursor structure into a pool of adhesive such that the flange of the septum cap, but not the resonator portion, comes in contact with the adhesive.

An exemplary adhesive application procedure is shown in FIG. 7. In this exemplary procedure, the honeycomb 12*p* is simply dipped into a pool 70 of adhesive so that only the flange portions of the septum caps 22*p* are immersed in the adhesive. It was found that the adhesive could be accurately applied to the anchoring surface/cell wall interface using this dipping procedure provided that the septum caps were accurately placed at the same level prior to dipping. For septum caps located at different levels, multiple dipping steps are required. Alternatively, the adhesive could be applied using a brush or other site-specific application technique. Some of these techniques may be used to coat the core walls with the adhesive before the septum cap is inserted. Alternatively, the adhesive may be screen printed onto the septum material and staged before insertion into the core The dipping procedure for applying the adhesive as depicted in FIG. 7 was found to work particularly well because any wrinkles present in the folded sheets of acoustic material provide small channels between the anchoring surface and cell wall that allows adhesive to be more easily wicked upward by capillary action. This upward wicking provides for fillet formation at the intersection of the outer edge of the resonator portion and the cell wall. The formation of adhesive fillets at the edge of the resonator portion not only provides for good bonding to the cell wall, but also provides a well-defined boundary between the adhesive and the resonator portion to insure that the acoustic properties of the resonator portion are not adversely affected by the adhesive.

The acoustic structures in accordance with the present invention may be used in a wide variety of situations where noise attenuation is required. The structures are well suited for use in connection with power plant systems where noise attenuation is usually an issue. Honeycomb is a relatively lightweight material. Accordingly, the acoustic structures of the present invention are particularly well suited for use in aircraft systems. Exemplary uses include nacelles for jet engines, cowlings for large turbine or reciprocating engines and related acoustic structures.

Figure 9:
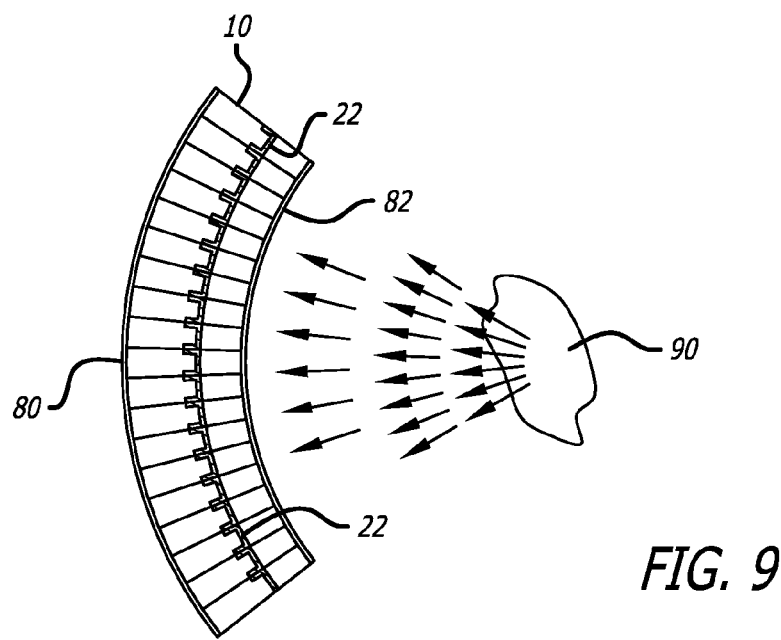
FIG. 9 is a partial sectional view of an exemplary acoustic structure (nacelle) that is located near a noise source (jet engine). The acoustic structure includes an acoustic honeycomb sandwiched between a solid skin and a perforated skin.

The basic acoustic structure of the present invention is typically heat-formed into the final shape of the engine nacelle and then the skins or sheets of outer material are bonded to the outside edges of the formed acoustic structure with an adhesive layer(s). This completed sandwich is cured in a holding tool, which maintains the complex shape of the nacelle during the bonding. For example, as shown in FIG. 8, the acoustic structure 10 is heat-formed into the final nacelle shape. The sandwich part is made by placing the solid sheet or skin 80 into the bonding tool, Next, a layer of adhesive is placed on the skin. This is followed by the addition of the shaped acoustic structure 10. The second layer of adhesive film is added and then the top skin 82. This completes the sandwich. The assembly is bonded with heat and pressure. The final nacelle shape is controlled by the bond tool. The panel will then conform around the jet engine, which is shown diagrammatically at 90 in FIG. 9.

Examples of Practice are as follows:

EXAMPLE 1

The following example provides details regarding an exemplary acoustic septum cap honeycomb in accordance with the present invention. It will be recognized by those skilled in the art that a wide variety of dimensions, honeycomb material, acoustic mesh material and adhesives may be used. In general, the particular structural and acoustic application will determine the various design requirements, which include core density, septum depth, acoustic impedance, core thickness, slice length, slice width and mesh material dimensions.

Exemplary Septum Core Product:

An exemplary acoustic septum cap core was made from fiberglass honeycomb with ⅜-inch cells. The septums were located 0.500 inch from the edge of the core, which was 1.25 inch thick. The acoustic impedance of the septum core was found to be 70 rayls.

Materials:

Honeycomb was supplied by Hexcel Corporation (Dublin, Calif.) and identified as Part number-HRP-3/8-4.5 pounds per cubic foot (pcf) (0/90 degree fiberglass architecture with phenolic resin). The density of the honeycomb was 4.5 pounds per cubic foot. Acoustic Mesh was obtained from SEFAR America, Inc. which was identified as Part number-17-2005-W022 (Nonmetallic woven mesh with an acoustic impedance range from 45 to 64 rayls).

The adhesive was obtained from Hexcel Corporation and identified as Part number-899-55. The adhesive is in the Polyamide-imide family, which is a proprietary material. Other adhesives, such as epoxies, acrylics, phenolics, cyanoacrylates and polyamides, may be used, if desired.

The Acoustic Core Dimensions were as Follows:

Core cell size: Typical cell size was 0.396 inch hexagonal inside dimensions measured from wall to wall. Slice thickness was typically 1.250 inch. The mesh inserted into the hexagonal cells was typically 0.700 inch by 0.650 inch rectangular shape. The mesh was folded to form the cap and inserted into honeycomb cell. The top of the cap conforms to the cell shape and size (hexagonal shape with inside dimensions of 0.396 inches). The side of the cap conforms to the honeycomb cell wall for adhesive attachment. The sides of the cap are typically 0.1875 inch long and are dipped into the adhesive for attachment of the septum cap to the honeycomb.

Adhesive Dipping and Curing Process:

The honeycomb core with the septum caps inserted into each cell is dipped as follows:
  a. The core is placed into a tank of adhesive with the top of the septum in the up position.
  b. The slice is lowered to a set level, which allows the adhesive to move up the honeycomb slice thickness and cover the bottom sides of the cap.
  c. The adhesive dip level up the side of the cap is typically 0.150 inch. The adhesive will wick up the last typical 0.0375 inch to close and lock the mesh fibers and bond the cap to the honeycomb wall.

The Adhesive Cure Cycle is Accomplished as Follows:

Immediately after dipping and draining, the core is placed into a 300° F. oven. The adhesive is subjected to a cure cycle of 300° F. for 30 minutes, 350° F. for 30 minutes and 400° F. for 30 minutes.

Acoustic Testing of Mesh and Septum Core:
  1. The above meshes provided by SEFAR America, Inc. can be adjusted by the supplier to provide a range of acoustic impedances from 25 to 120 rayls.
  2. The acoustic impedance range for the septum core can also be adjusted by the amount of adhesive placed on the mesh. Using an example of 50 rayl mesh that is inserted into the honeycomb. If the adhesive dip level is 0.100 inch up the sides of the cap. The additional unsealed mesh above the adhesive line will reduce the final core impedance in the cell to a typical 42 rayls. This would be the lowest impedance available with this design. If the adhesive seals up to the 0.1875 inch level—the typical impedance will be 70 rayl.

Test Methods for Mesh and Core:

Two methods of testing can be used for acoustic evaluation. The Raylometer or an individual cell vacuum testing for air permeability. The raylometer units are in rayls and the individual cell vacuum units are in K Pascals. The following table sets forth the results of an acoustic evaluation of acoustic septum cap honeycombs where the caps were mesh only (no adhesive) and where the caps were bonded into place with adhesive, as described above.

|  | Raylometer Method | Vacuum Method |
| --- | --- | --- |
| 17-2005-W022 (Mesh Only) | 50 Rayls | 32K Pascals |
| Septum Core (with adhesive) | 70 Rayls | 31K Pascals |

The vacuum reading for the mesh only core was made using a 0.250 ID vacuum test head with the mesh sealed against the opening. The vacuum reading for the Septum (Core was made inside one ⅜-inch septum cell. This is similar to a 0.396 inch ID test head. The vacuum head was calibrated as follows: Vacuum reading when open to the atmosphere 20 K Pa and when completely sealed to atmosphere 80 K Pa.

It should be noted that the acoustic impedance readings decrease as the area of mesh (more holes) increases. The typical resonator mesh has an open area of 2% to 4%. When sound waves pass through the acoustic mesh, the pressure of the waves causes the particles of the mesh to move. The sound impedance is the ratio of pressure and the particle velocity it produces in the mesh. In other words: The acoustic impedance is the pressure of the sound waves on the mesh divided by the instantaneous particle velocity of the mesh. As mentioned above, the unit of measure here for acoustic impedance is the rayl. The actual rayl units are in "pascal-seconds per meter". The acoustic impedance and vacuum pressure drop across the mesh material is a function of the open area (number and size of holes per unit area).

For example: when using Sefar mesh part number 17-2005-W022, the pressure drop for different sizes of circular mesh areas in septum cores (prepared as described above) were as follows:

| Mesh Diameter Inches | Mesh Area Sq-Inches | Vacuum Pressure Drop K-Pascals |
| --- | --- | --- |
| .355 | .099 | 31 |
| .375 | .110 | 29 |
| .510 | .204 | 26 |
| .570 | .255 | 23 |

This table shows that the number of holes increases with mesh area—and the pressure drop across the larger septum mesh area is lower.

The Sefar mesh part number 17-2005-WO22 used in the exemplary septum core, as described above, had a 0.355 inch diameter opening in the septum cap mesh, which gave vacuum readings of 31 K-Pascals and Rayl readings of 70 Rayls for this design.

When the vacuum drop is measured across the acoustic mesh in the ⅜ inch honeycomb cells the reading can range from 25 to 35 K-pascals and the acoustic impedance of the mesh in the ⅜ honeycomb cell will range from 50 rayls to 120 rayls.

As is apparent from the above example, the use of differing amounts of adhesive to bond the septum caps to the honeycomb provides one with the ability to increase or decrease the effective amount of area of mesh in the hexagon cell. This allows one to control the acoustic rayl value. For Example: If 60 rayl mesh is used in the septum cap. The cell impedance can be lowered to 50 rayls by allowing the mesh around the top sides of the cap to not be covered with adhesive. This approach generates more open area of mesh in the cell and will lower the effective acoustic impedance. If the adhesive is completely covering the sides and part of the radius between the vertical sides of the cap and the horizontal top of the septum cap the impedance will increase to 75 rayls.

EXAMPLE 2

Acoustic structures are made in the same manner as Example 1, except that solid films of crystalline VICTREX®PEEK™ are substituted in place of the PEEK mesh material. The solid films have thicknesses of between 0.001 and 0.015 inch. The films are cut so as to form hexagonal sheets that are from 0.1 to 0.4 inch larger than the 0.396 inch inside dimension of the hexagonal cell. This provides septum caps having flange portions that range in width from about 0.1 inch to 0.4 inch. The hexagonal sheets of PEEK are formed into septum caps having a resonator portion that matches the 0.396 inch inside dimension of the hexagonal cell. The various septum caps are inserted into the honeycomb. Adequate friction-locking of the septum to the honeycomb is then tested by using the test method that was mentioned previously where a 27 gram weight is placed on the septum. Those septums that pass the test and remain friction-locked in the honeycomb are suitable for mass fabrication and insertion into honeycomb for final adhesive bonding as set forth in Example 1. After adhesive bonding, the resonator portions of the septums are laser drilled to provide a perforated septum cap having from 100 to 700 holes per square inch where the holes range in size from 0.002 to 0.015 inch in diameter.

EXAMPLE 3

Acoustic structures are made in the same manner as Example 2, except that the solid films of crystalline VICTREX®PEEK™ are laser drilled prior to folding into septum caps to provide perforated films having from 100 to 700 holes per square inch where the holes range in size from 0.002 to 0.015 inch diameter.

Having thus described exemplary embodiments of the present invention, it should be noted by those skilled in the art that the within disclosures are exemplary only and that various other alternatives, adaptations and modification may be made with the scope of the present invention. Accordingly, the present invention is not limited to the above preferred embodiments and examples, but is only limited by the following claims.

What is claimed is:

1. A method for making an acoustic structure, said method comprising the steps of:
   providing a honeycomb comprising a first edge and a second edge, said honeycomb further comprising a plurality of walls that extend between said first and second edges, said walls defining a plurality of cells wherein each of said cells has a cross-sectional area measured perpendicular to said walls and a depth defined by the distance between said first and second edges;
   providing at least one sheet of flexible material that has a thickness and a perimeter, said flexible material being sufficiently flexible to be folded into the shape of a septum cap for insertion into said cell, said septum cap having a resonator portion that extends transversely across said cells and which has an outer edge to be located at said walls and a flange portion that is located between said outer edge of said resonator portion and the perimeter of said sheet of acoustic material, said flange portion extending parallel to said walls and comprising an anchoring surface having a width;
   forming said sheet of flexible material into said septum cap;
   locating said septum cap into said cell such that said septum cap is held in place only by friction locking of said septum cap to said walls, said anchoring surface being sufficiently wide and the bounce-back of said flexible material being sufficient to provide friction-locking of the septum cap to said cell walls; and
   adhesively bonding said anchoring surface to the wall of said honeycomb to form said acoustic structure.

2. A method for making an acoustic structure according to claim 1 wherein said sheet of flexible material is perforated prior to forming said sheet of flexible material into said septum cap.

3. A method for making an acoustic structure according to claim 1 wherein said resonator portion is perforated after said septum is inserted into said cell.

4. A method for making an acoustic structure according to claim 1 wherein said flexible material is a plastic.

5. A method form making an acoustic structure according to claim 1 wherein the steps of forming said flexible material into said septum cap and locating said septum cap into said cell are carried out together.

6. A method for making an acoustic structure according to claim 1 wherein said cell in which said septum cap is located comprises at least one corner and wherein some of said friction locking is provided by flexible material that is compressed into said corner of the cell.

7. A method for making an acoustic structure according to claim 1 wherein the width of said anchoring surface and the bounce-back of said flexible material is sufficient to provide substantially all of the friction locking of said septum cap to said cell walls.

8. A method for making an acoustic structure according to claim 1 wherein the combined surface areas of said perforations in said resonator portion is below 20 percent of the surface area of said resonator portion.

9. A method for making an acoustic structure according to claim 1 wherein the size of said perforations is from 0.002 inch to 0.015 inch.

10. A method for making an acoustic structure according to claim 1 wherein the thickness of said flexible material is from 0.001 to 0.015 inch thick.

11. A method for making an acoustic structure, said method comprising the steps of:
   a) providing a precursor acoustic structure comprising:
      a honeycomb comprising a first edge and a second edge, said honeycomb further comprising a plurality of walls that extend between said first and second edges, said walls defining a plurality of cells wherein each of said cells has a cross-sectional area measured perpendicular to said walls and a depth defined by the distance between said first and second edges;
      a septum cap that is held in place within at least one of said cells only by friction locking of said septum cap to said walls, said septum cap comprising a sheet of flexible material that has a thickness and a perimeter, said sheet of flexible material being sufficiently flexible to be folded and inserted into said cell to form said septum cap comprising a perforated resonator portion that extends in the same plane transversely across said cell and which has an outer edge located at said walls and a flange portion that extends between the outer edge of said perforated resonator portion and the perimeter of said sheet of flexible material, said flange portion extending parallel to said walls and comprising an anchoring surface which is in frictional contact with said walls, said anchoring surface having a width wherein the width of said anchoring surface and the bounce-back of said flexible material is sufficient to provide friction locking of said septum cap to said cell walls; and
   b) adhesively bonding said anchoring surface to the wall of said honeycomb to form said acoustic structure.

12. A method for making an acoustic structure according to claim 11 wherein said sheet of flexible material is perforated prior to forming said sheet of flexible material into said septum cap.

13. A method for making an acoustic structure according to claim 11 wherein said resonator portion is perforated after said septum is inserted into said cell.

14. A method for making an acoustic structure according to claim 11 wherein said flexible material is a plastic.

15. A method form making an acoustic structure according to claim 11 wherein the steps of forming said flexible material into said septum cap and locating said septum cap into said cell are carried out together.

16. A method for making an acoustic structure according to claim 11 wherein said cell in which said septum cap is located comprises at least one corner and wherein some of said friction locking is provided by flexible material that is compressed into said corner of the cell.

17. A method for making an acoustic structure according to claim 11 wherein the width of said anchoring surface and the bounce-back of said flexible material is sufficient to provide substantially all of the friction locking of said septum cap to said cell walls.

18. A method for making an acoustic structure according to claim 11 wherein the combined surface areas of said perforations in said resonator portion is below 20 percent of the surface area of said resonator portion.

19. A method for making an acoustic structure according to claim 11 wherein the size of said perforations is from 0.002 inch to 0.015 inch.

20. A method for making an acoustic structure according to claim 11 wherein the thickness of said flexible material is from 0.001 to 0.015 inch thick.

* * * * *